Figure 1:
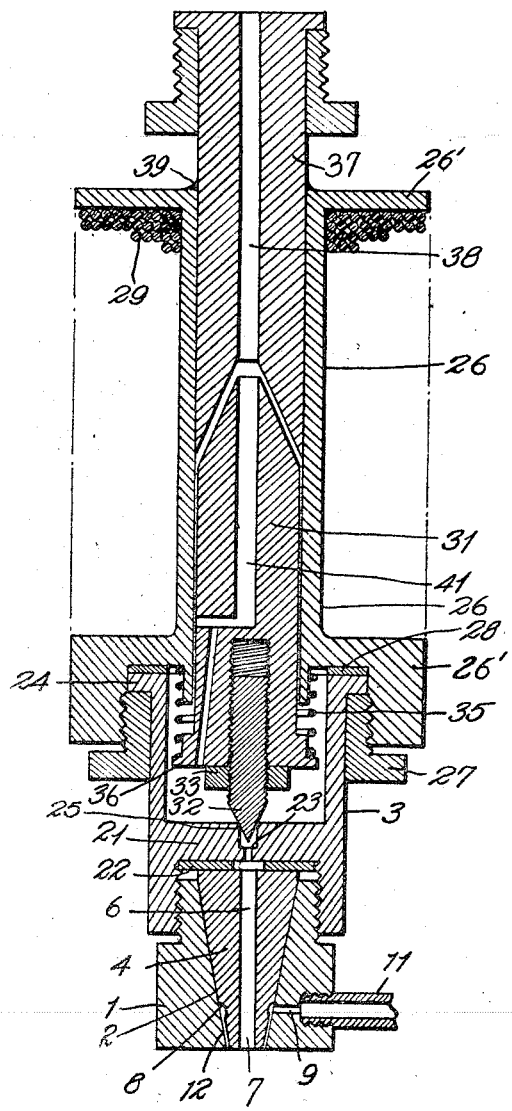

Patented Feb. 17, 1931

1,792,929

UNITED STATES PATENT OFFICE

JOHN T. REMEY, OF NEW YORK, N. Y.

METHOD OF PROJECTING FLUIDS

Application filed April 30, 1925. Serial No. 26,933.

This invention is a method for spraying fluids from nozzles.

The method is particularly for spraying into the air a fluid such as titanium tetrachloride, which hydrolyzes upon contact with the air and forms a dense white cloud. The particular use of such a smoke cloud is in the formation of letters or symbols in the air, by forming a plurality of contiguous and substantially parallel smoke trails by moving a column through the air by hanging it from a moving aircraft, all as described in my Patent 1,716,794 granted June 11, 1929. The smoke trails are released at a plurality of points along the depending column.

The invention is, however, not to be limited to the use of titanium tetrachloride, but is capable of application to other liquids or gases.

The cloud that is formed by the titanium tetrachloride may conveniently be called a smoke cloud, and the term "smoke" will be used in this description as meaning a visible mass of vapor or finely divided solids and is not intended to be limited to products of combustion.

In spraying a liquid or gas that reacts with the air into the air, the compound formed tends to collect around the discharge orifice and tends to plug it up. Especially is this true after the flow of fluid is shut off; in this situation, the fluid remaining in the discharge orifice after the flow is stopped reacts with the air and forms a plug that closes up the orifice. When the fluid is turned on again, it is found that the plug is not effectively dislodged. Part of it may be dislodged if the fluid pressure is sufficiently great, but part usually remains, seriously interfering with proper discharge.

According to this invention the formation of such plugs and encrustations at or around the discharge orifice is prevented, and this is done by the use of a second fluid which does not react with the air, used in conjunction with the discharge of the smoke-forming fluid. This second or inert fluid may be a liquid or a gas. In the case of titanium tetrachloride, which has an extraordinarily high affinity for moisture, the inert fluid is preferably thoroughly dried air, although a dry gas, such as anhydrous carbon dioxide, or a dry liquid, such as carbon tetrachloride.

The second or inert fluid just mentioned is preferably ejected from the discharge orifice practically simultaneously with the ejection therefrom of the smoke-forming fluid. This ejection of the two fluids is accomplished in either of two preferred ways. In each, there is more or less admixture of the two fluids. In the preferred method, the admixture occurs just after the smoke-forming fluid leaves the discharge orifice. In another embodiment, the inert fluid is mixed with the smoke-forming fluid just before the smoke-forming fluid is discharged.

In the preferred method, the stream of fluid issuing from the discharge orifice is surrounded by an annular sheet of inert fluid, so that the smoke-forming fluid does not contact with, and so cannot react with, the atmospheric air, until it has traveled some distance away from the discharge orifice. The formation of any encrustations at the discharge orifice is thus effectively prevented.

In the second embodiment, the smoke-forming fluid, just before its discharge, is mixed with the inert fluid, and they are discharged together. The inertia of the two fluids carry them out of the discharge orifice, and the reaction of the atmospheric air and the smoke-forming fluid is delayed somewhat, until the latter is a short distance away from the discharge orifice.

In both embodiments, the currents of inert fluid preferably flow continuously and so would mechanically remove any encrustations that might form, and would prevent the formation of the objectionable plugs and encrustations that have been mentioned. Such flow could, however, be intermittent, if desired.

The valve controlling the discharge of the smoke-forming fluid is preferably operated electromagnetically, the armature of a solenoid operating to move the valve, as will appear from the following more detailed description and drawings.

Figure 2:
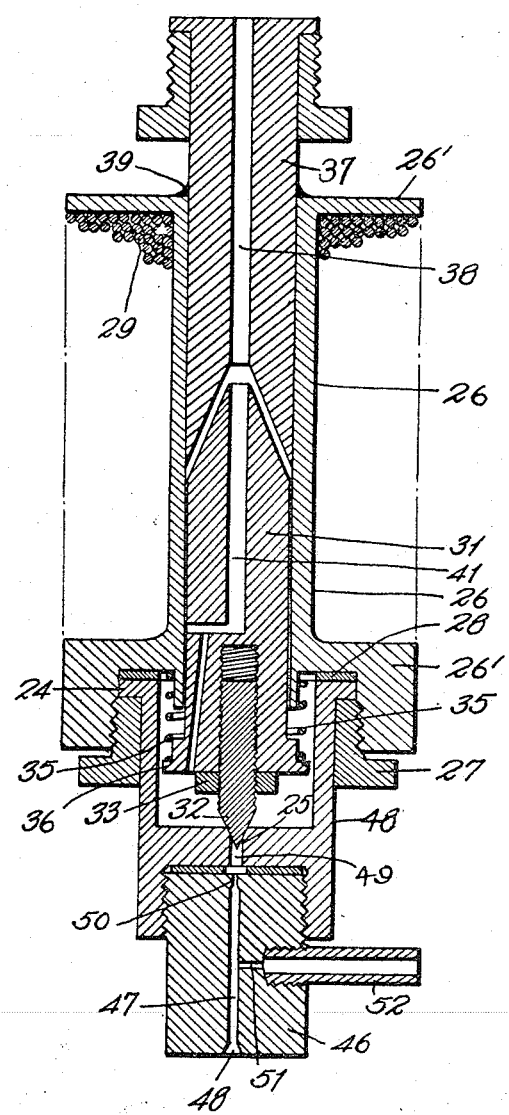

There is illustrated in the accompanying drawings the present preferred embodiments of apparatus for carrying out the invention. In these drawings, Fig. 1 is a sectional view of the preferred apparatus for carrying out the invention; and Fig. 2 is a sectional view of a modification.

Referring now to these drawings, in which similar reference characters indicate similar parts, the apparatus comprises a nozzle member composed of a plug 1 having a conical passageway 2 therethrough. The plug is threadably engaged with a shell 3. Fitted into the conical passageway 2 is a conical plug 4 having a passageway 6 therethrough. The smoke-forming fluid is fed into the passageway 6 as will be described. Toward the discharge end 7 of the conical plug, there is provided an annular distributing groove 8, which communicates with a hole 9 drilled in plug 1. A pipe 11 is threaded into plug 1 in communication with the hole 9. An inert fluid under pressure, such for instance as dried air or anhydrous carbon dioxide, is supplied to the pipe 11.

The conical plug above the groove 8 fits into the conical passageway with a close, driving fit. Below the groove, however, the wall of the conical plug is spaced away from the wall of plug 1 a very small distance, forming an annular passageway 12, the location and size of which are important features of the invention. The inert gas issues from the passageway 12 in the general form of a hollow conical sheet or shell, which is annular and, which completely surrounds the stream of smoke forming fluid issuing from the discharge orifice 7 and so insulates it for a time from contact with the atmospheric air. The result of this is that the "smoke" thus formed—which "smoke" is a very finely divided solid—is formed at some distance from the orifice 7 and so the solid does not encrust the edge of the orifice. Furthermore, the continuously flowing hollow sheet of inert gas issuing from the annular passage 12 prevents the residual smoke forming fluid, remaining in the mouth of passage 6, from reacting with the atmospheric air and forming encrustations of a plug that would tend to seal up the passage. Again, any encrustations that might form would be blown off by the inwardly directed stream of inert gas, as soon as such encrustations had attained any appreciable size. If a crust or plug should form across orifice 7, it would be blown off when the smoke forming fluid is turned on again.

The air or other inert fluid, as it issues from the annular passage 12 acquires a high velocity, which is very effective in atomizing the fluid and aiding its reaction with the atmospheric air.

The size of the annular passageway 12 is also of importance. With titanium tetrachloride, the width of this annular passage is very small, a few thousandths of an inch. Using titanium tetrachloride the pressure of inert gas, in pipe 11, is preferably between 60 and 100 pounds.

Between the upper end of the conical plug 4 and the transverse wall 21 of the shell 3 is a sealing means, here shown as a centrally apertured gasket 22. The wall 21 has a small hole 23 therethrough for the smoke-forming fluid, which opens into a larger hole the edges of which form a valve seat 25. The hole 23 serves to limit the flow of smoke-forming fluid to any desired amount.

The shell 3 has an outturned flange 24, and is held in place in the lower end of a housing member 26 by a collar 27 threaded into the lower end of the housing. A gasket 28 forms a tight seal.

The housing 26 has flanges 26' defining a space for the windings 29 of a solenoid. The valve stem 31 and the valve 32 threaded into the lower end thereof form the armature of the solenoid. The valve 32 may be variably positioned with respect to the stem, and held in set position by the lock collar 33.

The stem 31 has a loose sliding fit in the housing, and the lower part of the stem, and the valve 32, are within the space in shell 3. A spring 34 bearing against the housing and a flange 36 on the stem, urges the valve to closed position.

In the upper part of the housing is a second plug 37 made of iron provided with a central passage 38 for smoke forming fluid under pressure. A tight seal is assured by solder at 39. The lower end of plug 37 and the upper end of stem 31 are conical as shown.

The stem 31 and valve 32 are immersed in the smoke forming fluid. The stem 31 may fit loosely enough for the liquid to flow past it. To assure a free flow, a passageway 41 may be provided on the outside or inside of the armature 31.

With this construction the use of a gland or stuffing box packing is eliminated.

In operation, smoke-forming fluid is fed into passageway 38. When it is desired to form smoke, a current is sent through the solenoid, which draws up the armature 31 and opens the valve. The spring 35 closes the valve when the current is turned off. The action of the conical sheet of inert gas for preventing encrustations at and plugging of the discharge orifice 7 has already been described.

In the modification shown in Fig. 2 a nozzle plug 46 is provided having a central hole 47 therethrough, opening into a flared discharge orifice 48, the sides of which are at an angle of about 30 degrees to each other. The plug 46 is threaded into shell 48 corresponding in its main details to shell 3 of Fig. 1. A small hole 50 for preventing too great a flow of fluid, is provided at the upper end of plug 46, leading into main passage 47 in the plug. Shell 48 has a hole 49 for delivering fluid to the nozzle plug 46.

An inert fluid, such as dried air or anhydrous carbon dioxide, is led into the hole 47 through a hole 51 in communication with a pressure pipe 52. This flow is preferably continuous.

The other parts of this modification are the same as in Fig. 1 and are correspondingly numbered.

In working with titanium tetrachloride, a pressure of 120 lbs. for the tetrachloride, 90 lbs. for the inert fluid gas, diameter of hole 50, 0.010 inch, diameter of hole 51, 0.020 inch, and diameter of hole 47, 0.031 inch, are satisfactory quantitative relations.

The mixture of inert gas and smoke-forming fluid issues from the discharge orifice and reacts with the atmospheric air. After the flow of smoke-forming fluid is stopped, the continuous flow of inert gas clears out residual fluid from the passage 47 and so prevents the formation of encrustations around the discharge orifice. The removal of encrustations is facilitated by the flared discharge mouth 48.

While the invention has been described in some detail, it should be understood that the disclosure is illustrative and not restrictive of the invention, and that it may be carried out in other ways, and in other apparatus, than in the precise forms described.

I claim as my invention:—

1. The method of projecting into the air a fluid that tends to hydrolyze upon coming into contact with the moisture in the air, comprising discharging the fluid into the air, and simultaneously discharging a surrounding envelope of another fluid, which does not react with the first fluid.

2. The method of projecting into the air a fluid that tends to hydrolyze upon coming into contact with the moisture in the air, comprising intermittently discharging the fluid into the air, and simultaneously and continuously discharging a surrounding envelope of another fluid, which does not react with the first fluid.

3. The method of spraying into the air a liquid that tends to hydrolyze upon coming into contact with the moisture in the air, comprising discharging the liquid, and surrounding the stream thus discharged with a converging annular sheet of an inert fluid that is simultaneously discharged the converging sheet of inert fluid protecting the first fluid from immediate contact with the air.

4. The method of spraying into the air a liquid that tends to hydrolyze upon coming into contact with the moisture in the air, comprising discharging the liquid, and simultaneously discharging an annular sheet of inert fluid that surrounds the liquid discharged, which annular sheet serves to insulate the liquid from immediate contact with the atmospheric air and to atomize it.

5. The method of projecting into the air a fluid that tends to hydrolyze upon coming into contact with the moisture in the air, comprising intermittently discharging the fluid, and simultaneously and continuously discharging an annular sheet of inert fluid that surrounds the first fluid discharged, which annular sheet serves to insulate the first fluid from immediate contact with the atmospheric air.

6. The method of spraying titanium tetrachloride and the like into the air for forming a smoke cloud, comprising discharging the tetrachloride or the like into the air, and simultaneously discharging an envelope of anhydrous fluid which surrounds the emerging stream of tetrachloride or the like, for preventing and removing encrustations at the place of discharge.

7. The method of spraying titanium tetrachloride and the like into the air for forming a smoke cloud, comprising continuously discharging a hollow annular sheet of an inert fluid into the air, and intermittently discharging the titanium tetrachloride or similar substance into the hollow annular sheet of inert fluid, from a point inside the annular sheet of inert fluid, whereby the continuous flow of inert fluid prevents and clears away encrustations at the point of discharge.

8. The method of spraying titanium tetrachloride and the like into the air for forming a smoke cloud, comprising continuously discharging an annular sheet of inert fluid into the air, and intermittently discharging inside of such annular sheet the titanium tetrachloride or similar substances, whereby the tetrachloride or similar substance is insulated from immediate contact with the atmospheric air, and is atomized.

9. The method of projecting into the air an active fluid that hydrolyzes upon coming into contact with the atmospheric air, including the steps of discharging a sheet of inert fluid in substantially annular form, and discharging within this annular sheet the active fluid, the inert fluid acting to insulate for a time the active fluid from contact with the atmospheric air.

10. The method of projecting into the air a fluid that hydrolyzes upon coming into contact with the atmospheric air, including discharging the fluid, and mixing the fluid with an inert fluid for delaying the hydrolyzing action between the first fluid and the atmospheric air.

11. The method of forming a visible cloud with titanium tetrachloride or the like, including the steps of discharging an inert fluid in the form of a hollow sheet, and discharging the titanium tetrachloride or the like within this hollow sheet, the hollow sheet of inert fluid acting to insulate for a time the titanium tetrachloride or the like from contact with the atmospheric air.

12. The method of spraying into the air a liquid that tends to hydrolyze upon coming into contact with the moisture in the air, comprising discharging the liquid, and simultaneously discharging an annular sheet of inert fluid in surrounding and converging relation to the liquid discharged, in such manner as to insulate the discharged liquid from immediate contact with the atmospheric air, and to atomize said liquid.

In testimony whereof I affix my signature.

JOHN T. REMEY.